(12) United States Patent
Gong et al.

(10) Patent No.: US 10,136,315 B2
(45) Date of Patent: Nov. 20, 2018

(54) PASSWORD-LESS AUTHENTICATION SYSTEM, METHOD AND DEVICE

(71) Applicants: Guang Gong, Waterloo (CA); Xinxin Fan, Waterloo (CA); Bo Zhu, Waterloo (CA)

(72) Inventors: Guang Gong, Waterloo (CA); Xinxin Fan, Waterloo (CA); Bo Zhu, Waterloo (CA)

( * ) Notice: Subject to any disclaimer, the term of this patent is extended or adjusted under 35 U.S.C. 154(b) by 280 days.

(21) Appl. No.: 14/687,699

(22) Filed: Apr. 15, 2015

(65) Prior Publication Data

US 2015/0304847 A1 Oct. 22, 2015

Related U.S. Application Data

(60) Provisional application No. 61/995,660, filed on Apr. 17, 2014.

(51) Int. Cl.
| | |
|---|---|
| *H04W 12/06* | (2009.01) |
| *H04W 12/04* | (2009.01) |
| *H04B 7/14* | (2006.01) |
| *H04W 12/08* | (2009.01) |
| *H04L 29/06* | (2006.01) |

(52) U.S. Cl.
CPC ............. *H04W 12/06* (2013.01); *H04B 7/14* (2013.01); *H04L 63/0823* (2013.01); *H04L 63/0869* (2013.01)

(58) Field of Classification Search
CPC . H04L 63/0853; H04L 63/0876; H04L 63/18; H04L 9/3268; H04L 63/0823; H04L 9/321; H04L 63/0869; H04L 9/3263; H04W 12/06; H04B 7/14; G06F 21/34; G06F 21/35

USPC ............... 713/168, 182, 185; 726/7, 2, 5; 455/410, 411
See application file for complete search history.

(56) References Cited

U.S. PATENT DOCUMENTS

| | | | | |
|---|---|---|---|---|
| 7,142,840 | B1 * | 11/2006 | Geddes | ............... H04L 63/0853 455/411 |
| 8,627,438 | B1 * | 1/2014 | Bhimanaik | ............. H04L 63/10 726/9 |
| 9,571,282 | B1 * | 2/2017 | Aggarwal | ................ H04L 9/32 |
| 2004/0210756 | A1 * | 10/2004 | Mowers | ............. H04L 63/0807 713/168 |

(Continued)

FOREIGN PATENT DOCUMENTS

WO WO 2012156785 11/2012

OTHER PUBLICATIONS

Bo Zhu et al, Loxin-A solution to password-less universal login, 2014 IEEE INFOCOM Workshops, IEEE, 2014.*

(Continued)

*Primary Examiner* — Shanto Abedin

(57) ABSTRACT

A password-less authentication system is described herein. Also described are the devices used for such a system and the method and process implemented. The system employs asymmetric cryptography to enable users to log in to various systems or services on different platforms or computers by the aid of a mobile device. Users' credentials are kept privately in the mobile device, and not leaked to the network or any web service. In addition, the web service can verify users' authentication request by solely public information of users' credentials.

31 Claims, 9 Drawing Sheets

(56) References Cited

U.S. PATENT DOCUMENTS

| | | | |
|---|---|---|---|
| 2008/0003980 A1* | 1/2008 | Voss | H04L 63/0853 455/411 |
| 2009/0204815 A1* | 8/2009 | Dennis | H04L 63/10 713/168 |
| 2011/0067095 A1* | 3/2011 | Leicher | H04L 63/06 726/10 |
| 2013/0145446 A1 | 6/2013 | Dorso et al. | |
| 2013/0159732 A1 | 6/2013 | Leoutsarakos | |
| 2013/0185815 A1 | 7/2013 | Leotsarakos | |
| 2013/0312078 A1 | 11/2013 | Oberheide et al. | |
| 2014/0033286 A1 | 1/2014 | Zhang | |
| 2014/0136836 A1 | 5/2014 | Huang et al. | |
| 2014/0282961 A1* | 9/2014 | Dorfman | H04L 63/0853 726/7 |
| 2015/0096001 A1 | 4/2015 | Morikuni et al. | |
| 2015/0220718 A1* | 8/2015 | Hong | H04L 63/0807 726/9 |
| 2015/0249540 A1* | 9/2015 | Khalil | H04L 63/0853 713/158 |

OTHER PUBLICATIONS

Alexei Czeskis et al, Strengthening User Authentication through Opportunistic Cryptographic Identity Assertions, ACM (Year: 2012).*

* cited by examiner

PASSWORD-LESS AUTHENTICATION SYSTEM, METHOD AND DEVICE

CROSS REFERENCE TO RELATED APPLICATIONS

This application claims the benefit of, and priority to, U.S. Provisional Patent Application No. 61/995,660 filed on Apr. 17, 2014, which is incorporated herein in its entirety by reference.

FIELD OF INVENTION

The invention relates generally to the field of user authentication. More particularly, the invention relates to a password-less authentication system, method, and device.

BACKGROUND OF INVENTION

With the advent of cloud services and web applications, users frequently access many different web or cloud services. Nowadays, we are likely to have more than ten accounts for computers, email accounts, websites, social networks, and various other cloud services, all with different security policies and passwords. Memorizing all passwords is both difficult and annoying, so people often tend to use simple passwords, or forget infrequently used ones. it would be very useful to develop a secure and convenient login system for accessing cloud services, which neither involves memorizing dozens of alphanumeric combinations, nor adds layers of complexity for users.

For password-based authentication methods, their security is mainly determined by the difficulty of guessing a user's password. Unfortunately, passwords usually have low cornplexities and are easier to guess than many users think To further enhance the security of password-based web applications, a promising solution is to deploy a technology called two-factor or multi-factor authentication. According to this approach, a user is required to provide additional authentication information besides passwords. The second piece of information is typically generated by a physical token (e.g., RSA SecurID™) or a software application (e.g., Google Authenticator™). It different service providers set up their own two-factor authentication services, users may have to experience painful registration and login processes repeatedly.

A naive way to reduce users' burden for holding multiple passwords for different cloud services is to store users' credentials in a single device or service, and use certain key derivation functions to generate temporal passwords for sequential logins. However, this approach exposes the authentication server as a primary target of attackers The other approach is to employ an Internet-scale identity system that defines standardized mechanisms enabling the identity attributes of its users to be shared between web applications and cloud services. A number of industry initiatives and standards such as OpenID, SAML, and OAuth have emerged to deliver an Internet-scale identity system during the past few years. The basic idea of those identity systems is to authenticate users with the aid of trusted Identity Providers (IDPs).

The forgoing creates challenges and constraints for providing a secure and convenient login process. It is an object of the present invention to mitigate or obviate at least one of the above mentioned disadvantages.

SUMMARY OF INVENTION

The present invention is directed to methods, systems, and devices for providing alternative and secure approaches for authenticating users in order to grant users access to services, without requiring any password.

In one aspect of the invention, there is provided a method of authenticating a user request of a user to gain access to a computerized service. The method includes the steps of: upon receiving the user request, the computerized service transmitting an authentication request to an authentication service, along with user information and authentication request data that includes user request information associated with the user request and information about the computerized service, upon receiving the authentication request, the authentication service transmitting an approval request to a user device of the user, the approval request including at least a portion of the authentication request data, wherein the user device and user identity information included in the user information are pre-registered with the authentication service, the computerized service computing a verification result from a user approval response transmitted from the user device, public user data and the authentication request data, the user approval response being generated at the user device from both the authentication request data received at the user device and additional private user data and a copy of the user identity information stored at the user device, the additional private user data being cryptographically related to the public user data, the user approval response being transmitted to the computerized service utilizing the information about the computerized service, and the computerized service granting access as requested in the user request only upon successful verification of the user approval response.

In another aspect of the invention, there is provided a system for providing a computerized service to a user that requires authentication of the user, the user having a pair of public encryption key and a corresponding private encryption key and having a user device that has stored thereon the private encryption key and user identity information. The system includes an authentication service connectable with the computerized service for receiving authentication request from the computerized service and connectable with the user device for forwarding approval request, the user device and the user identity information being pre-registered with the authentication service; a computerized service module for providing the computerized service; a user interface connected to the computerized service module, for receiving and forwarding to the computerized service module a user request to gain access to the computerized service; the computerized service module being configured to generate authentication request data and forward an authentication request, a copy of the user identity information, and the authentication request data to the authentication service upon receiving the user request, the authentication request data including user request information associated with the user request and information about the computerized service; the authentication service being configured to transmit an approval request to the user device upon receiving the authentication request, the approval request including at least a portion of the authentication request data; and the computerized service module being further configured to compute a verification result from a user approval response transmitted to the computerized service by the user device utilizing the information about the computerized service, the verification requiring both the user's public encryption key and response data included in the user approval response, the response data being generated, at the user device, from the portion of the authentication request data included in the approval request and the user's private key, and to grant access as requested in the user request only upon successful verification of the user approval response.

In yet another aspect of the invention, there is provided a communication device for providing authentication of a user to a networked service, the networked service being connected to an authentication server over a communication network, the user having a pair of public and private encryption keys. The communication device includes a cryptographic unit; a user I/O unit; a network interface for connecting the communication device to the communication network; a non-transient storage device having computer instructions, user identity information and the private encryption key stored thereon; and a microprocessor for executing the stored computer instructions stored. The stored computer instructions, upon being executed by the microprocessor, cause the microprocessor to perform steps of a method comprising the steps of: upon receiving an approval request from the authentication server through the network interface, the approval request including authentication request data generated at the networked service in response to an access request initiated by or on behalf of the user, the authentication request data including user request information associated with the user request and information about the networked service being accessed: rendering the authentication request data on the user I/O unit for user inspection; receiving an input indicating user approval from the user at the user I/O unit; generating a user approval response based on the user input, the user approval including an authentication signature computed by the cryptographic unit from the authentication request data, the user identity information, and the private encryption key stored on the memory storage device; transmitting the authentication signature to a callback network address of the networked service utilizing the network interface, the callback network address being contained in the authentication request data.

In one other aspect of the invention, there is provided a method of registering a user device of a user to an authentication server connected to a communication network, the user device having stored thereon a pair of public encryption key and a corresponding private encryption key issued to the user, the method comprising the steps of: selecting user identity information data of the user; obtaining a digital certificate issued by a certification authority and generated from the user identity information data and the public encryption key; obtaining from a message relay service message relay information that includes channel identification data identifying a relay channel for connecting the user device to the message relay service, transmitting the digital certificate and the channel identification data to the authentication server; the authentication server generating a challenge and sending the challenge to the user device; the user device generating a registration signature, using the private encryption key, from the challenge, the channel identification data and the user identity information data, and transmitting the generated registration signature to the authentication server for verification; and the authentication server associating the user identity information data with the channel identification data if the registration signature is successfully verified.

In another aspect of the invention, there is provided a method of authenticating a user request from a user device to gain access to a computerized service, the user having a pair of public and private encryption keys, the user device having a non-transient storage device and the non-transient storage device having stored thereon the private encryption key and a public-key certificate generated from user identity information and the key pair. The method incudes the steps of: upon receiving the user request from the user device, the computerized service transmitting an authentication request to an authentication service residing on the user device, along with authentication request data that includes user request information associated with the user request and information about the computerized service, upon receiving the authentication request, the authentication service rendering at least a portion of the authentication request data for inspection by the user, receiving an input indicating user approval from the user entered using the user device, the authentication service generating a user approval response, if the user approval is received, using the private encryption key, and sending the user approval response and the public-key certificate to the computerized service for the computerized service to verify the user approval response and to extract the user identity information from the public-key certificate.

In one aspect of the invention, there is provided a method of authenticating a user requesting access to a computerized service. The user has a pair of public key and a corresponding private key. The method comprising: transmitting an access request to the computerized service, the computerized service generating an authentication request and providing the authentication request to an authentication service separate from the computerized service, the authentication request including authentication request data provided by the computerized service, receiving from the authentication service it response at a callback address included in the authentication request data, the response including a digital signature signed using the user's private key, the response being generated incorporating at least the authentication request data, verifying the digital signature, and upon successful verification of the digital signature, the computerized service granting the access request to the user.

As a feature of this aspect of the invention, the authentication service is provided by an authentication server connected to the computerized service over a communication network. As a further feature, the response is generated by a user device of the user, which is connected to the authentication server over the communication network and prior to generating the response, the user device registers the user's identity information and message relay information to the authentication server, and the authentication server stores the user's identity information and the message relay information in an associated relationship for later use. After providing the authentication request to the authentication service, the authentication server relays the authentication request data to the user device utilizing a relay channel identified by the message relay information, and the user device generates the response and forwards the response to the computerized service at the callback address.

As one additional feature, the user device renders the authentication request data for user inspection upon receiving the relayed authentication request data from the authentication server, and generates the response and forwards it to the computerized service at the callback address only When receiving an approval confirmation from the user entered using the user device.

As another additional feature, the relay channel is a communication channel between a message relay service connected to the communication network and the user device, arid the method includes the additional steps of the authentication server forwarding the authentication request data to the message relay service, identifying to the message relay service the communication channel using the message relay information, and the message relay service relaying the authentication request data to the user device through the communication. channel between the user device and the message relay service.

As a further additional feature, the method also includes the additional steps of the user device receiving the message relay information from the message relay service, the user device transmitting the message relay information to the authentication server, and the authentication server storing the message relay information on a storage device and associating the message relay information with the user identity information.

As another feature of this aspect of the invention, the computerized service and the authentication service are executing on a common user device, and the computerized service provides an internal address as the callback address in the authentication request data.

As one additional further feature, the authentication request data includes login information relating to the access request. The method includes the additional steps of: the authentication service rendering the login information for visual display to the user, receiving an indication of approval of the access request from the user entered using the user device, generating the digital signature using the user's private key, and sending the response, including the digital signature, to the internal address provided by the computerized service.

In another aspect of the invention, there is provided a system for providing authentication of a user to a service, the service being connected to a communication network, the service granting access to the user upon successfully verifying an authentication signature signed by a user device of the user using a private key of a public/private key par owned by the user, the system comprising: an authentication server connected to the communication network for receiving authentication request from the service and for receiving registration request from a user, the authentication server having a memory storage device, the memory storage device having stored thereon user identity information data and channel identification data associated therewith, wherein the channel identification data containing information identifying a communication channel between a user device of the user and a message relay service connected to the network, wherein the authentication server is configured to, upon receiving an authentication request together with the corresponding user identity information data from the service, the authentication request being generated by the service in response to an access request at the service initiated by or on behalf of a user and containing authentication request data generated by the service, retrieve from the memory storage device the channel identification data associated with the user's user identity information data, generate an approval request, the approval request including the authentication request data, and send the approval request to the message relay service for relaying to the user device for the user device to generate an authentication signature from the authentication request data and the user identity information data using the user's private key, and wherein the service grants access to the access request if the service receives from the user device at a callback address identified by the server the authentication signature and successfully verifies the authentication signature.

In yet another aspect of the invention, there is provided a communication device for providing authentication to a networked service, the networked service being connected to an authentication server through a communication network and having a communication channel linking a message relay service, said communication device comprising: a cryptographic unit; a network interface for connecting the communication device to the communication network; a memory storage device: and a microprocessor for executing instructions stored on the memory storage device; wherein the instructions, upon being executed by the microprocessor, cause the microprocessor to perform steps of a method comprising the steps of: upon receiving an approval request from the message relay service through the communication channel, the approval request including authentication request data generated by the service in response to an access request initiated by or on behalf of the user, making available to the user information content of the access request contained in the authentication request data; receiving an approval confirmation from the communication device, generating an authentication signature using the user's private key from the authentication request data and the user's identity information data; transmitting the authentication signature over the communication network to a callback address contained in the authentication request data for the service to verify and to grant access to the user's access request upon successful verification of the authentication signature.

In yet another aspect of the invention, there is provided a method of registering a user device of a user to an authentication server connected to a communication network, the user device having stored thereon a pair of public key and a corresponding private key owned by the user, the method comprising the steps of: selecting user identity information data of the user; obtaining a digital certificate issued by a certification authority, the digital certificate containing the public key of the public/private key pair and the user identity information data; obtaining the user's channel identification data, the channel identification data containing information identifying a communication channel between a message relay service and the user device, providing the digital certificate and the channel identification data to the authentication server; the authentication server generating a challenge and sending the challenge to the user device of the user; the user device generating a registration signature using the private key from the challenge, the channel identification data and the user identity information data, and transmitting the registration signature to the authentication server for verification; the authentication server associating the user identification information data with the channel identification data if the registration signature is successfully verified.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

Figure 1:
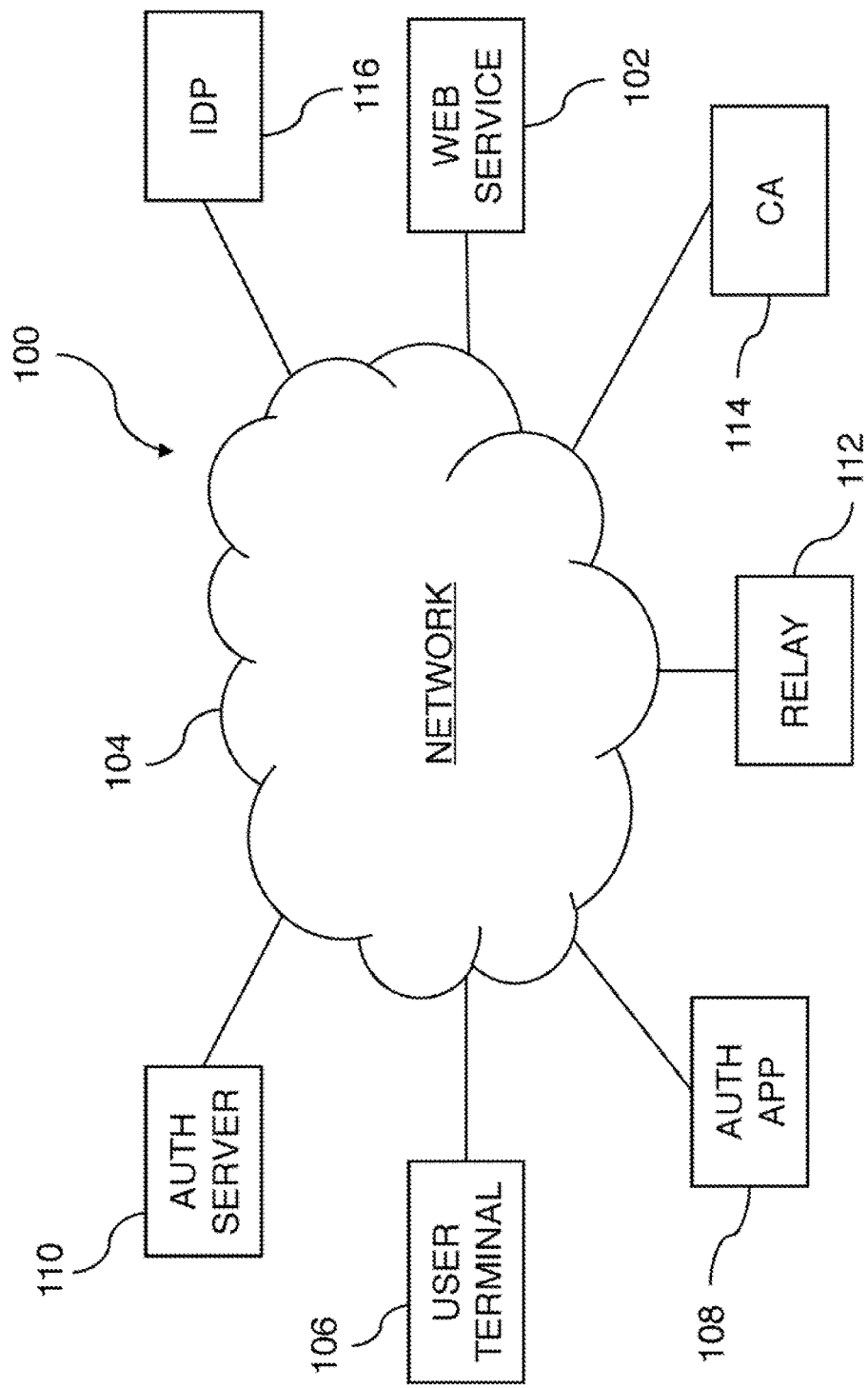
FIG. 1 is a block diagram of a system for authenticating a user to one or multiple services, such as networked or web services, using a networked user device, such as a mobile device.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The invention is directed to methods, systems, and devices for providing alternative and secure approaches for authenticating users in order to grant users access to services. As used herein, a service means a computerized service provided by certain hardware platform with computation power, which may be a locally provided service such as a software application executing on the same local device (which often simply may be referred to as software applications, or apps), or may be a remote service, such as a web service, or any service that is provided or accessible via a communication or computer network, such as web-based or cloud-based data, applications, and services. Examples of web services may include, but are not limited to, web-based or cloud-based data storage services, cloud, computing services, social networking applications, online shopping services, online document editing, email services, microblogging accounts, mobile payment services, multimedia content (i.e., audio or video) delivery services, and financial services (such as credit/banking services, online trading). Authentication may be provided as alternative to or in addition to providing or entering a username and password pair. This may tend to simplify user authentication process for gaining access to web services or any other services that require user authentication. As one example, a user may gain access to one or multiple web applications or cloud services with only several taps on their mobile devices or networked user devices (e.g., a mobile phone, a smart phone, a smart watch, a tablet, or other portable electronic terminals), which generally have own computation power and memory storage capabilities.

FIG. 1 is a block diagram of a system 100 for authenticating a user to one or multiple services 102, such as networked or web services. The user accesses the service 102 or services over a communication network 104 using a user terminal 106, such as a computer terminal, a workstation, a personal computing device, a smart phone handset having computation power built-in, among others. Or, the user may also access the service through some intermediary such as some trusted computation or automation facilities, which the user has authorized to access the service on the user's behalf. Of course, it will be understood that if the service is a local service, then a user may simply attempt to gain access to the service locally using the same device hosting the service. When a request to gain access to the service 102 is initiated over a communication network 104, either by the user, for example using a user terminal 106, or on behalf of the user, for example, by one of the intermediaries trusted by the user, or when a request to gain access to a locally provided, service is requested from a user, the service 102, instead of verifying the user's credentials or authenticating the user directly, forwards the access request (more commonly, a login request) to the system 100, and causes an authentication service residing in the system to generate a response and send it back to the service that requests the authentication. The response may be a digital signature signed with the user's private key and generated from data such as user's identity information and the authentication request data provided by the service requesting authentication. The service requesting authentication may then verify the response received and grant access to the user if the response is successfully verified. According to one approach, an authentication service of the system 100 processes the request, and sends an approval request to a user device 108 of the user that is known to the system 100 (or "registered" to the system 100). The user will then provide the requested approval (or reject the request, e.g., if the request was not initiated with the user's knowledge or authorization). The user's user device 108, if the user approves the request, generates and sends a signature to the service 102, for it to verify. If the verification is successful, the service 102 will grant access.

According to the implementation illustrated in FIG. 1, system 100 has an authentication server 110 connected to a communication network 104, which provides the authentication service over the network. The authentication server 110 communicates with a message relay service 112, also connected to the communication network 104. Often, message relay service 112 is provided by a third party but system 100 may also include its own message relay service 112 or have a message relay service 112 integrated with its authentication server 110. The authentication server 110 and message relay service 112 may be executing on the same hardware unit, but often they execute on their own hardware units.

Figure 2:
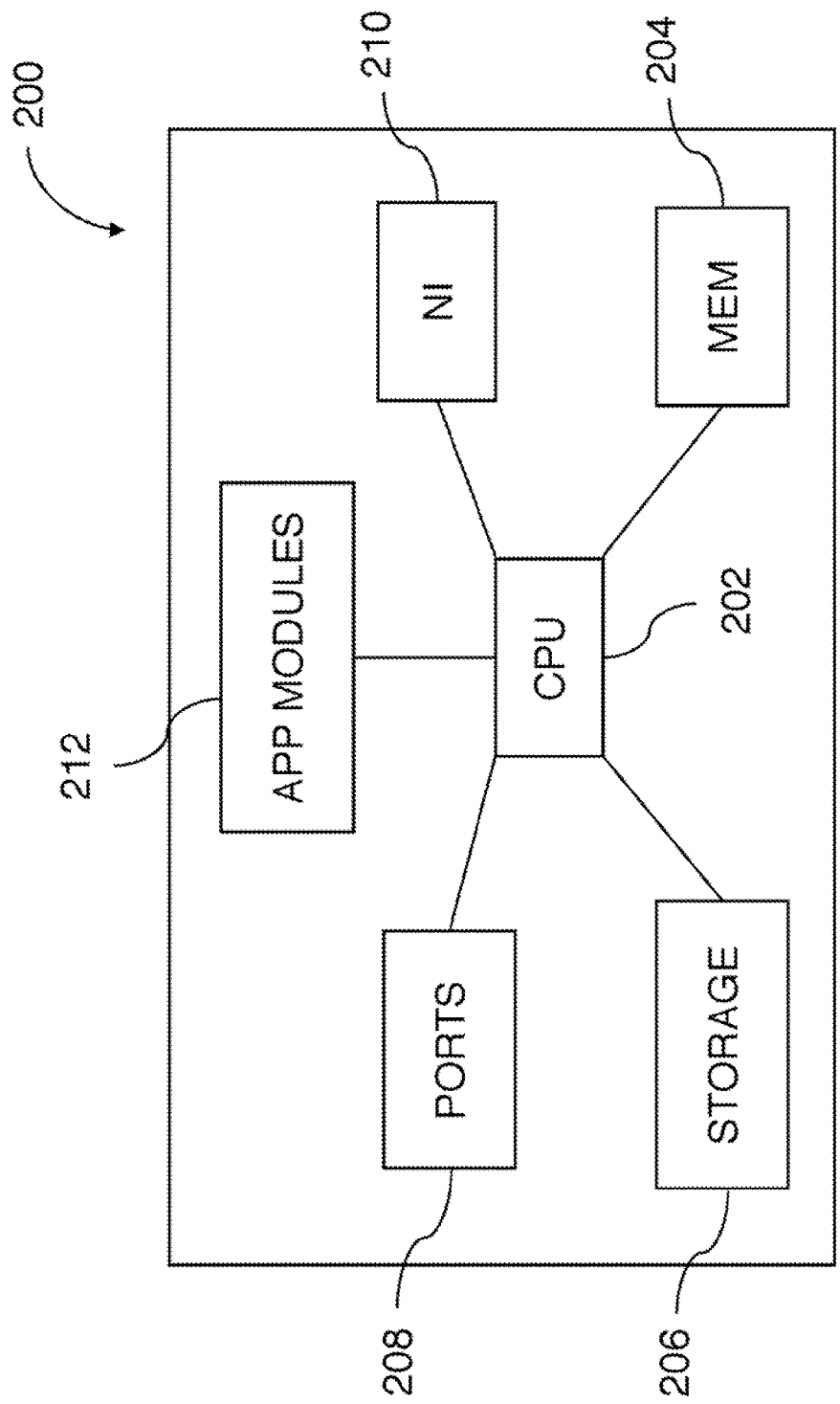
FIG. 2 is a block diagram to illustrate common components of a hardware unit such as a user device, a user terminal or a computer server.

Referring to FIG. 2, hardware unit 200 may be a server or computer or some hardware device with computation power, which often includes one or more microprocessors or CPUs 202 (central processing init), one or more memory storage devices, such as a transient memory device 204 and a long-term storage device 206, some local and communication ports 208 for connection to local devices., a network interface 210 for connection to the communication network 104, and one or more application modules 212 executing on the microprocessor or CPU 202 for performing certain programmed functions. Though it should be understood that a given hardware unit may include more than, or not all of, these components. For example, a user device or an authentication server may include a cryptographic unit as one of the one or more application modules 212, but a user terminal may not include such a cryptographic unit. It is also possible that an authentication server 110 (or a message relay service 112) executes on a cluster of such hardware units. In general, when a user device or a server or some other hardware unit performs a method or carries out a process, it will be understood that, such method or process is performed by the microprocessor or CPU as a result of the application module or modules being executing on the microprocessor or CPU. From the context, it also will be clear whether it is the hardware unit itself that is being referenced, or the application that programmed the hardware unit. Further, when a hardware unit may have several application modules executing on the microprocessor or CPU, it will be clear from the context which application module is causing the microprocessor or CPU to execute the function (e.g., a cryptographic unit performing a cryptographic operation). Where the context may not uniquely identify a particular module or indicate whether it is the hardware unit itself that is being referenced, it will be identified explicitly in the description. Thus, the function as described being provided by an application module will be understood to be the same as being provided by the hardware unit, as programmed by the instructions of the program that is stored on a non-transitory physical medium or media, e.g., stored on the storage device 206. Similarly, when a hardware unit is described to perform a function, it will be understood that the hardware unit performs the function as being configured by the instructions of an application module or modules stored on the storage device 206.

In order for an authentication server 110 (and a message relay service 112) to provide the authentication service and to process any access request or login request of a user forwarded from service 102, it will be necessary to register the user to the authentication server 110 to enable a user device 108 of the user, so that the authentication server 110 will have the information about the registered user device 108 when it needs to forward to the user device any access request for the user to approve. As will be further described, authentication server 110 stores users' registration information that will be used by authentication server. Such registration information may be stored in a database and will include user identity information data (e.g., user ID) and a registered user's user device information. In addition to storing user device information, authentication server 110 also stores information about a communication channel, or relay channel, between the user device and the message relay service 112. Although information about different aspects of the communication channel may be retained, the main purpose of this information is to identify the communication channel to the message relay service 112, so that a communication channel can be identified to the message relay service 112 when relaying of message is requested. This information therefore will be referred to as communication channel identification information, or channel ID, Often, channel ID relating to a user device is provided or assigned by the message relay service 112. Authentication server may also store other information about the system, such as information about location or identity of message relay services it contacts during the authentication process, and a list of public-key certificates associated with user IDs. Authentication server 110 provides the functionality of processing a user's access/login request forwarded to it from a service 102 and forwarding the access/login request to a registered user device for user approval and further processing. Authentication server 110 also provides the registration function, which may be provided in cooperation with a message relay service, and may he optionally with further assistance from a certificate authority 114 (CA) and an identity provider 116, so that a user can register to the authentication server 110 and enable a user device 108 of the user. The details of registering to an authentication server 110 and the process of handling an access request and forwarding it to a registered user device 108 will be further described below.

Message relay service 112 provides message relay services. It generally enhances a user's experiences with the system 100, especially if authentication server 110 does not provide a long-term connection to user device 108. In general, a message relay service 112 establishes a communication channel between the message relay service 112 and a user device 108. The communication channel generally is long-term, though in a real-life environment, such communication channel may be momentarily disrupted, for example, due to the user device. being taken off-line, disconnected from the communication network, or prevented from connecting to the message relay service, or during message relay service's out-of-commission period. Some examples of third party message relay services may include Google Cloud Messaging for Android™ and Apple Push Notification Service, user device, once being assigned a communication channel, has the exclusive use of the channel Any message sent by the message relay service 112 through the communication channel will reach only the assigned user device, not anyone else. A communication channel may be a dedicated connection between a user device and the message relay service and may also be a communication channel established between the user device and the message relay service over a communication network, such as a VPN (virtual private network) connection. When a message relay service has such a communication channel established, or designated for the user's user device, the message relay service generally issues some piece of information or data to the user, such as a channel ID, to identify the communication channel assigned to the user (i.e., the user's user device). The information, such as the channel ID, issued by the message relay service 112 may also contain certain private information that cannot be easily guessed, such that only the entities who know the information can use the established communication channel. The user (or the software application executing on the user's user device) may provide the channel ID to an authentication server 110 during the registration step for the authentication server 110 to send data or messages to the user device 108 via, the relay service 112, which will be described in further detail below.

As will be appreciated, to take advantage of the system 100, both the service 102 and the user's networked user device 108 will need to be enabled. For example, a service .102 that is enabled will forward the access request to the system 100 and then processed by authentication server 110. A service that is not enabled would attempt to authenticate the access request itself Similarly, a user's user device 108 that is enabled will expect to receive approval request that is processed and forwarded from system 100. Additionally, once approved by a user using an enabled user device 108, the enabled user device 108 will generate appropriate approval information and forward the generated approval information to the service so that the service can complete the authentication process. A networked user device that is not enabled would not expect to receive any approval request from the system and also would not follow directions embedded in the approval request to approve the request.

Figure 3:
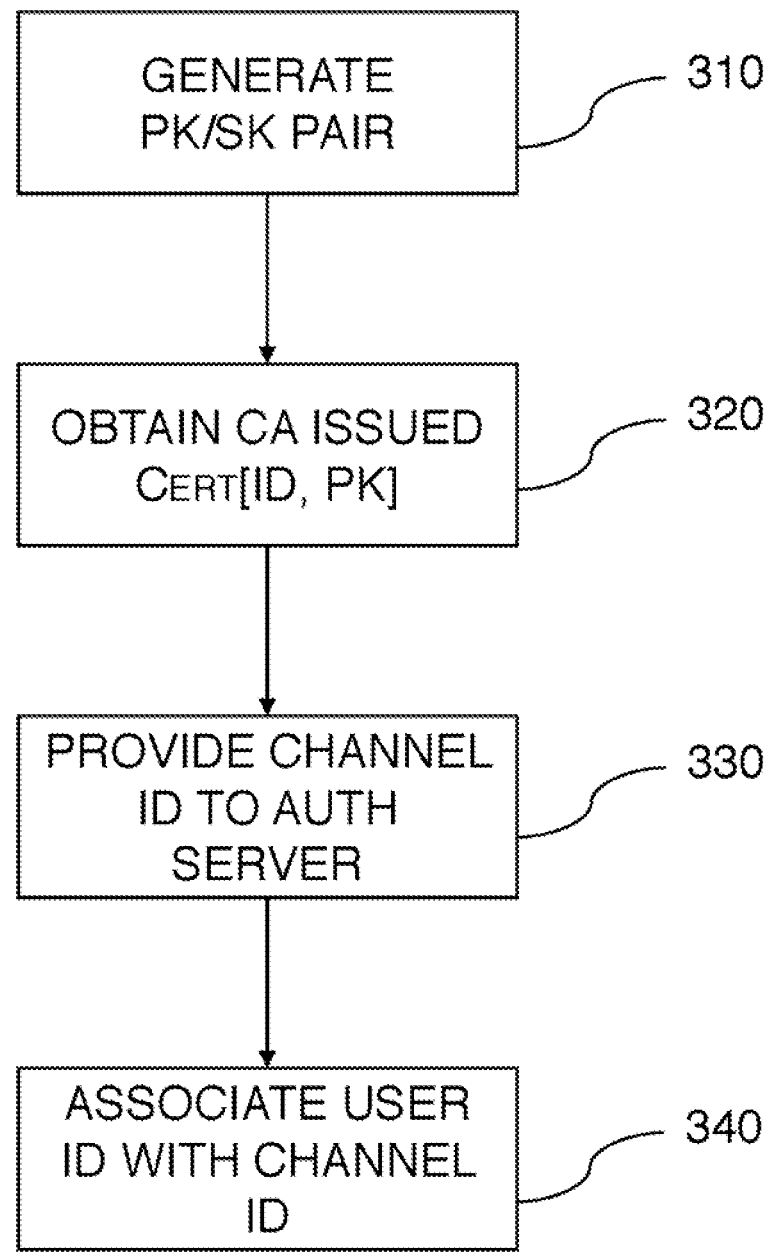
FIG. 3 is a flowchart diagram illustrating a user registration process, to both register a user to the system illustrated in FIG. 1 and to enable a user device shown in FIG. 1.

FIG. 3 illustrates a user registration process, to register a user to the system 100 and also to enable the user's user device 108 for use with the system. This registration process is a one-time registration process. It is understood that the user device 108, such as a mobile device, will have a software application installed. A user device 108 generally has its own computation power and often has the same categories of hardware components as described in connection. with hardware unit for an authentication server. The software application contains instructions and may be stored on the storage device 206, so that its built-in microprocessor or CPU 202 may perform the process steps programmed by these instructions and to be described in particular, a user device 108 for use with the system 100 may have a cryptographic unit as one of the one or more application modules 212 and a network interface 210 for connecting the user device to a communication network. A user device may also have other components, such as an imaging device, or camera, and the corresponding application imaging processing modules 212 for processing any image single received from the camera or any image data captured by the camera and stored on the storage device 206. An application module, for example, named as AUTH APP, may be stored on the storage device 206 and executing on CPU 202 to perform the registration function, and later, during the authentication process, perform steps of the authentication process carried out by a registered user device.

Referring to FIG. 3, the registration process starts with the generation of a pair of a public key and a corresponding private key, or a public/private key pair (step 310), PK/SK, where PK denotes a public key of the public/private key pair and SK denotes the private key of the public/private key pair. Any public-key or asymmetric algorithm, such as RSA, ElGamal, and Elliptic Curve Cryptosystem (ECC), may be used. The public/private key pair generally may be conveniently generated at the user device, using its built-in CPU 202 and a cryptographic unit 212 (or a cryptographic program) as one of its application modules. This is not necessary, though, as the public/private key pair may also be generated elsewhere. For example, in an enterprise, this may be generated at a central location and on a secure platform, with the resulting key pair transferred to the user device, either through a networked connection or other means (e.g., through a USB storage device connected to a mobile device at one of its ports). Thus, while the key pair is required, its generation is not a required step of this process. All that is required is that a key pair is made available to the user device 108.

Next, the user device 108 obtains a digital certificate issued by a certification authority (step 320). The digital certificate contains, i.e., incorporates, a public key, PK, of a public/private key pair PK/SK owned by the user and also user identity information data, ID, of the user. This step includes several sub-steps and is further illustrated in FIG. 4.

Figure 4:
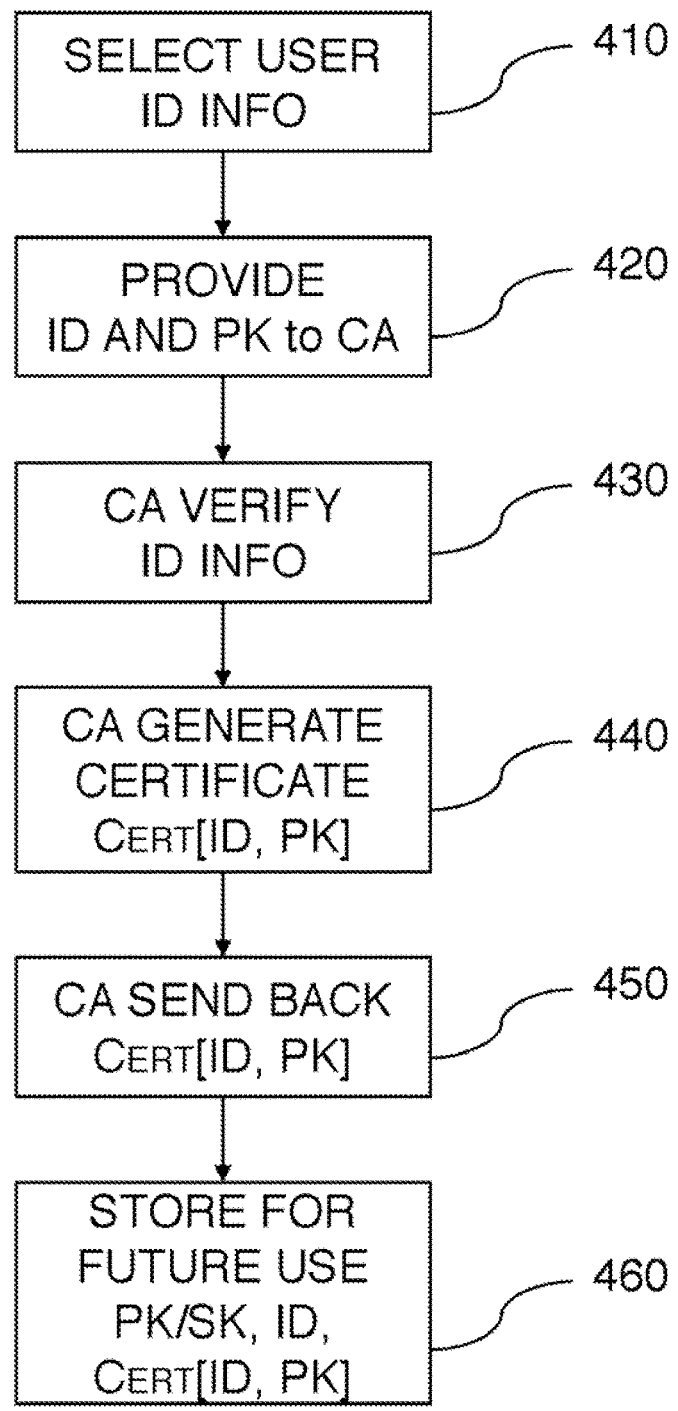
FIG. 4 is a flowchart diagram illustrating a process of obtaining a digital certificate from a certificate authority to certify a user's public key and identity information data.

Referring to FIG. 4, identity information that may be used to identify the user is selected (step 410). The user identity information data (user ED) may be conveniently an e-mail address of the user, or some user account ID at another networked service, such as a Facebook™ user account, or some information that uniquely identifies the user but not necessarily easily verifiable over a communication network, such as a user's driver license information. At step 420, the user device 108 transmits the public key PK and the selected user identity information data, user ID, to the certification authority ("CA") 114 over the communication network 104.

The CA 114, upon receiving the public key and the user identity information data from the user device, verifies user identity information contained in the user identity information data at step 430. The verification may be, if an e-mail address is used as the user's identity information, simply waiting for a response at a URL specified in an e-mail message sent to the e-mail address, which may be done by an identity provider 116. It may also be to verify manually the driver's license information with a relevant government agency. Conveniently, this verification process may be automated by requiring that only user identity information that may be verified over the communication network 104 and between the CA 114 and an identity provider 116 will be accepted. This will help facilitate the identity verification done by the CA 114 so that human intervention would be unnecessary or as little as possible.

Once the CA 114 is able to successfully verify the user's identity information, the CA 114 generates a digital certificate using the public key PK and the user identity information data ID received at step 440, so that the digital certificate contains the public key and the user identity information, both received from the user device 108. At step 450, the CA 114 transmits the digital certificate, Cert[ID, PK], to the user device 108 over the network and the user device 108 subsequently stores the certificate (step 460), together with the he pair (if it is generated for this certificate and not stored as yet) for future use. Here we use Cert[ID, PK] to denote the certificate issued by the CA 114, which is associated with ID and PK, and also contains the information of FD and PK. Often, Cert[ID, PK] may also contain other information such as expiration time, signature algorithms, and issuer information, as defined by the International Telecommunication Union's X 509 standard.

Of course, similar to the generation of PK/SK key pair, the process of obtaining the digital certificate Cert[ID, PK] also can he done at a central location, without the involvement of the user device 108, or even without the involvement of the user. For example, in an enterprise, an employee may be assigned an employee number, which can be used as the identity information. With the generation of PK/SK key pair also at the central location, the information technology personnel of the enterprise may simply generate (or request to be generated) the required digital certificate that incorporates both the employee number and the public key, and then simply save the digital certificate and the pair of public key and private key PK/SK to the user device, before the user device (e.g., a company smart phone or a company tablet computer) is issued to the employee. Therefore, it will be understood that the step of obtaining the digital certificate or receiving the digital certificate from the certification authority may also be a step of storing an existing certificate and the corresponding key pair to the user device.

Referring back to FIG. 3, after the certificate is obtained, the next step, step 330, is to provide user's channel ID to the authentication server 110. This Channel ID is generally obtained from message relay service 112. This is message relay information that identifies a message relay or communication channel between the user device and the message relay service. As the relay service may be provided by a third party server, the process of generating the channel ID may vary. What is required here is the provision of an exclusive communication channel between the user's user device and the message relay service and a piece of channel ID data that identifies this exclusive communication channel. As noted earlier, the channel ID may also contain certain private information for avoiding messages from unintended senders. For example, if Google Cloud Messaging for Android™ is used as a message relay service, the information issued by Google Cloud Messaging for Android™ may also contain a Sender ID and a Sender Auth Token.

Next, the user device 108 provides the channel ID obtained from the message relay service 112 to the authentication server 110 and the authentication server 110 associates the user identity information ID with the channel ID in a verifiable manner (step 340) to complete the registration process. This step is explained in detail with reference to FIG. 5.

Figure 5:
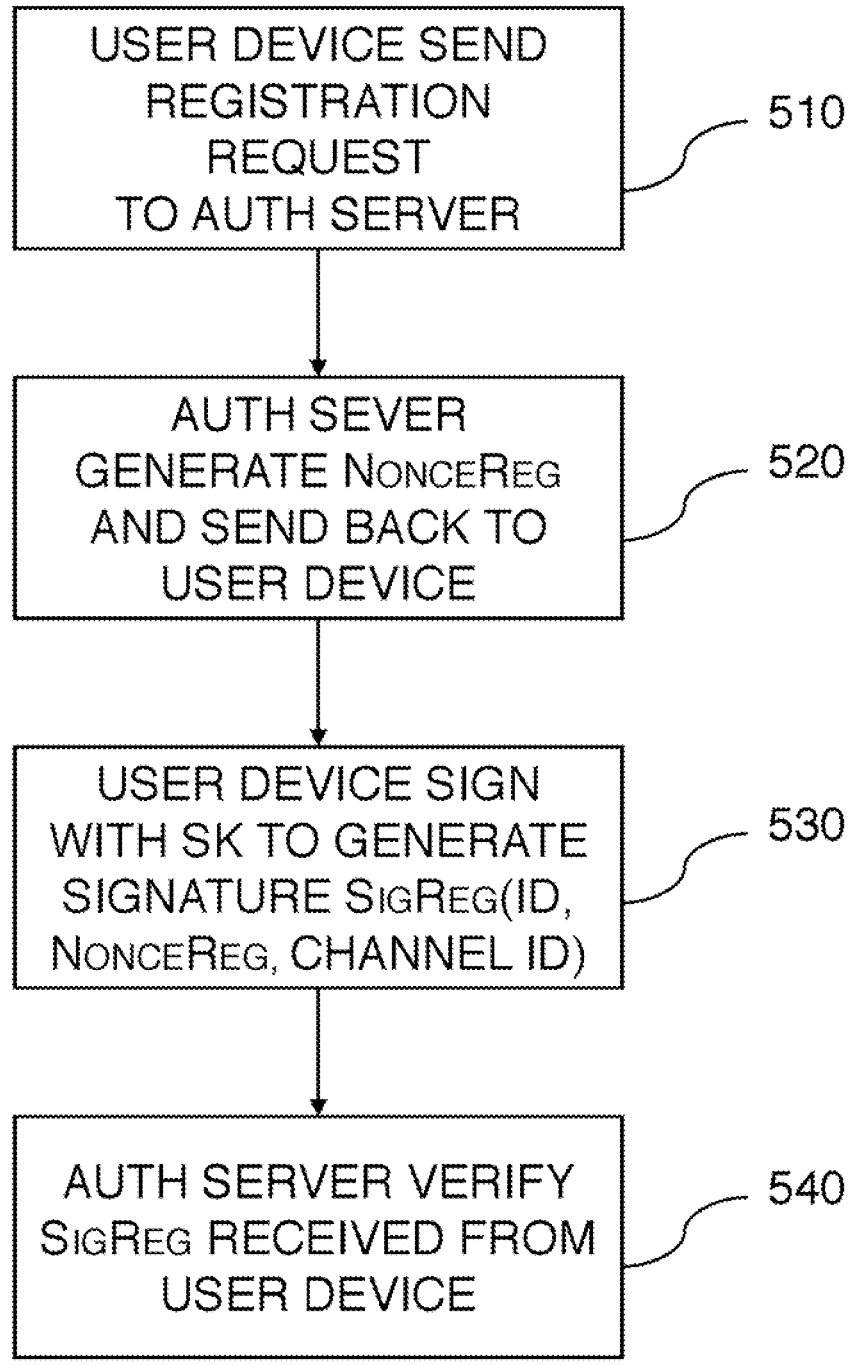
FIG. 5 is a flowchart diagram illustrating a user registration process to enable a user device for use with the system shown in FIG. 1.

Referring to FIG. 5, the user device 108 sends a registration request to the authentication server at step 510. The request includes the digital certificate and the channel ID. The authentication server 110 generates a reply message, or challenge, and sends the reply message to the user device 108 at step 520. The reply message may consist of a number/string. NonceReg, which is often required to be unique for each registration request for a given pair of ID and channel ID, and may be generated randomly. If the nonces repeat, the old digital signatures recorded by attackers may be sent to the service to gain access bypassing the user's approval, a type of attacks generally known as replay attacks. In practice, the notices are usually generated or implemented by a long random number, such that the chance of nonce repeating is extremely low. How long the random number should be, i.e., the size of the number, generally is a design choice and is affected by a number of factors such as the level of security required, general computation power of the hardware unit, among others, but is typically configured, i.e., pre-selected, prior to use.

At step 530, upon receiving the challenge NonceReg from the authentication server 110, the user device 108 signs the user identity data ID, channel ID data (received at step 510), and the challenge NonceReg to generate a digital signature, namely registration signature SigReg(ID, NonceReg, channel ID), and transmits the registration signature SigReg back to the authentication server 110 for verification. SigReg(ID, NonceReg, channel ID) denotes a digital signature computed based on at least a portion, often all, of the information of the topic (ID, NonceReg, channel ID) by using a public-key or asymmetric cryptographic algorithm, such as RSA, DSA or ECDSA.

At step 540, the authentication server 110 verifies the registration signature SigReg. If the signature is successfully verified, the authentication server 110 associates the user identification information with the channel ID to complete the registration process. The authentication server 110 stores the user identity data ID and the associated channel ID for later use and reference. The user identity data ID may be associated with the channel ID simply by storing them in a database associated with the same database key.

After a user is registered to the authentication server 110 using the user's user device 108 (i.e., an authentication software application, AUTH APP, installed on use device 108), the user is registered to the system 100 and the user's user device is said to be enabled or registered. The user device that is used in the registration process is now a registered/enabled user device. The user now is ready to use the system 100 to authenticate the user to service 102, using the enabled user device 108, without having to use or provide a password established for that service.

Separately, a service 102 also will need to be enabled. This typically involves installation/modification of it software application that executes on the hardware unit of the service 102. The enabling software application is to configure the service to perform the following functions. When the service 102 receives a login or access request from a user using a user terminal, the service does not attempt to authenticate the user. Instead, the service is configured to generate a callback address Addr for this access request, and a challenge NonceAuth. The challenge NonceAuth generally is unique for any given pair of ID and Addr, and is typically a sufficiently large number as required by a particular cryptographic algorithm used in the system. Similar to NonceReq, the uniqueness of NonceAuth will help preventing potential attacks such as replay attacks. Next, the service 102 transmits to the authentication server 110 both the service generated NonceAuth and Addr, and the user identification information, or user ID, that the service 102 received from the user terminal 106 in the access request. When the expected information (a digital signature as will be described further) is received at the callback address Addr, the service 102 is further configured to verify the signature and grant access to the user for the user terminal) as requested only the verification is successful. These steps performed by an enabled service will be further described below in connection with the password-less authentication process.

Figure 6:
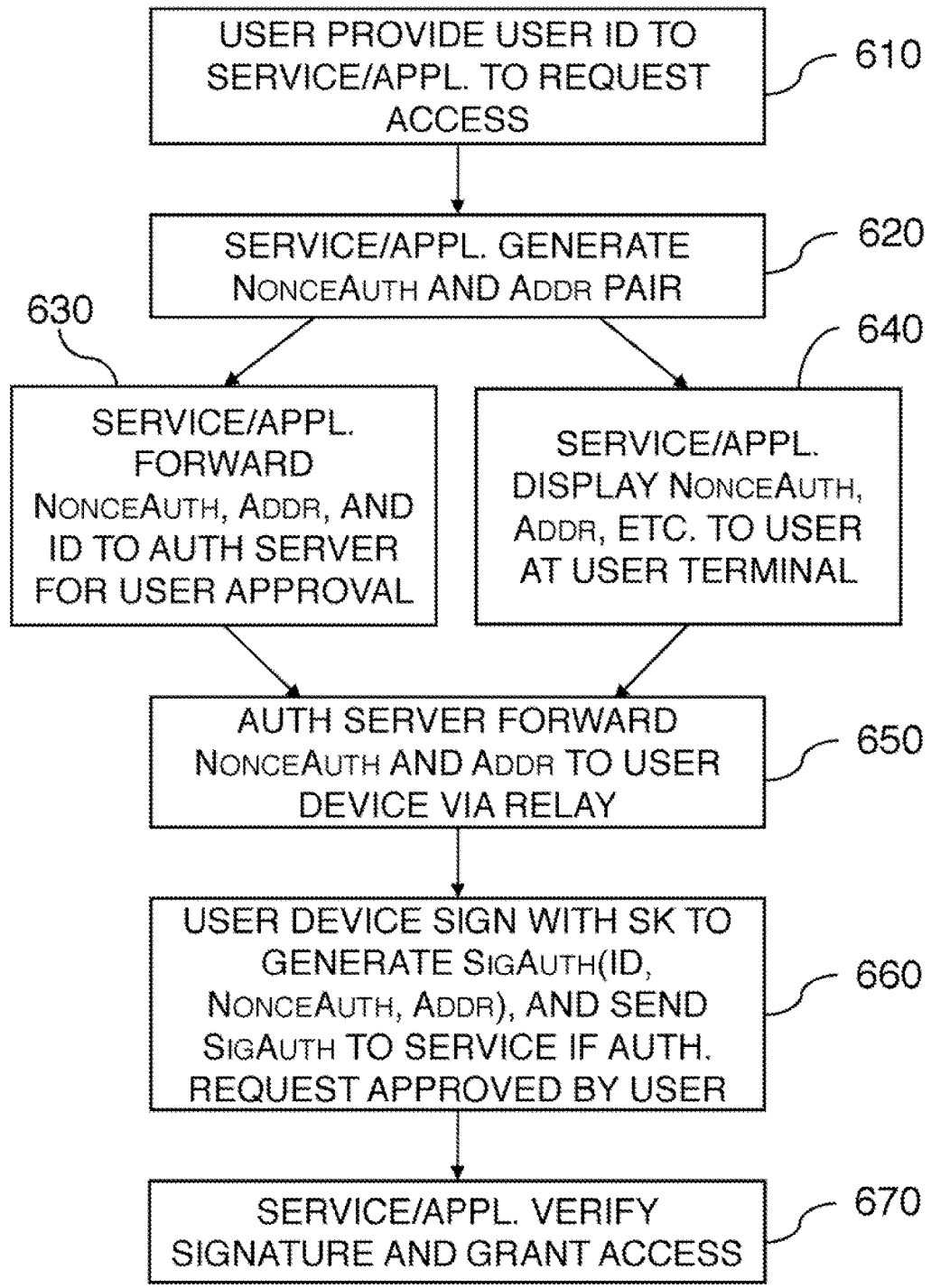
FIG. 6 is a flowchart diagram illustrating a user authentication process carried out by the system illustrated in FIG. 1, with an enabled user device prepared according to the process illustrated in FIG. 5.
Figure 7:
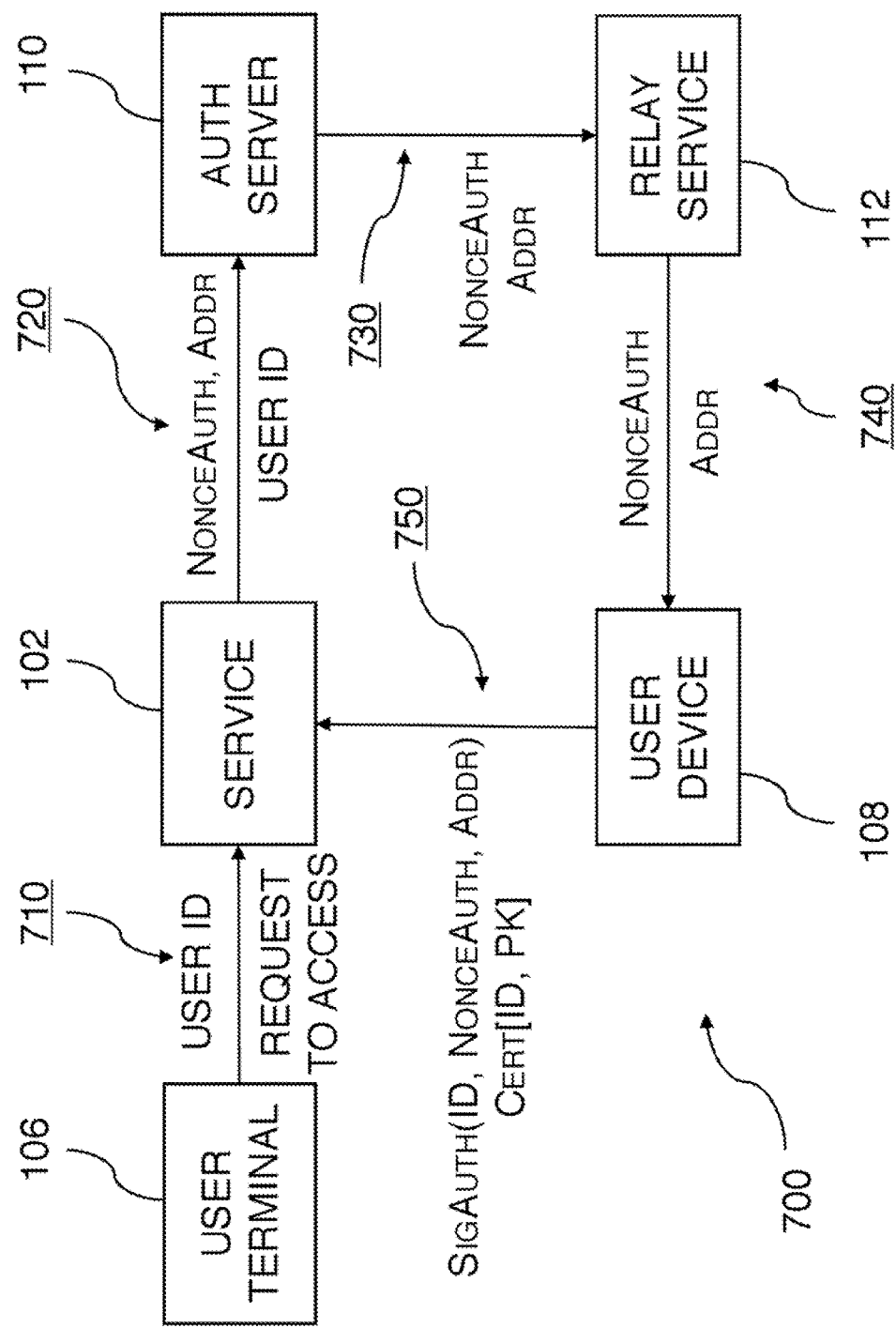
FIG. 7 is a block diagram illustrating the flow of information in a user authentication process illustrated in FIG. 6.

Referring to FIG. 6, there is shown a flowchart illustrating a password-less authentication process using the system shown in FIG. 1 and a user device enabled for this system as described above in reference to FIG. 5. FIG. 7 is a block diagram illustrating the flow of information through various members and participants of the system in a password-less authentication process shown in FIG. 6.

When a user desires to gain access to a service 102 over a communication network 104, e.g., from a user terminal 106, the user first submits an access request to the service 102 (or such a request be sent to the service on behalf of the user) at step 610. The access request (710) includes the user's ID, namely the user's identity information data used in the registration process if the service 102 is enabled, then, instead of verifying the user identity or authenticating the user directly, the service 102 requests the authentication server 110 to forward an authentication request to the user's registered, i.e., enabled user device 108, and request the user to approve the authentication request.

Before this authentication request is sent to the authentication server 110, at step 620, the service 102 selects a callback address Addr, which is reachable by a device over the communication network 104. The service also generates a challenge NonceAuth, which may be a sufficiently large number as required by a particular cryptographic algorithm used in the system. NonceAuth generally is unique for each access request for a given pair of ID and Addr. It also may contain login information. Login information is information generally related to the login request, such as a timestamp of the user's login request, the service's domain name, some identity information of the user terminal, or location or identity of the party that initiated the login/access request. The callback address Addr is for the user device 108 to send back information that the service 102 will use to authenticate the user, as will be described later.

The authentication request (720) includes as request data a pair (NonceAuth, Addr) and is sent by the service 102 to authentication server 110 for it to forward to user device 108 (step 630). Meanwhile, the service 102 also displays the request data information to the user, such as displaying login information on the user terminal 106, or otherwise makes it available to the user for user review and confirmation (step 640). The information may be either presented in the form that is generated or stored by the service, or more conveniently for the user, in a more understandable or easier to recognize format. For example, a hashtag can be computed based on the values of NonceAuth and Addr in order to get a shorter string for comparison, The hashtag or the information of NonceAuth and Addr can also be converted into barcode or colorful pictures for displaying on the user terminal's display screen for visual comparisons. To reduce the risk of potential leakage or malicious modifications by attackers, the information sent from the service 102 to the user terminal 106 for display should be protected by certain secure communications, such as TLS/SSL.

In addition to the request data, the service 102 also sends the user identity information data ID along with the authentication request.

When the authentication server 110 receives the authentication request from the service 102, the authentication server 110 simply requests the message relay service 112 to forward an approval request to the registered user device 108 (step 650). To do this, authentication server 110 searches ID in its database in order to retrieve the corresponding channel ID associated with the user ID. As described earlier, the channel ID may be a token issued by the message relay service 112, or may include certain private information about the communication channel between the .message relay service 112 and the enabled user device 108 Once the associated channel ID is retrieved, the authentication server 110 sends request data (NonceAuth, Addr) (730) to the message relay service 112 and requests the message relay service 112 to forward a request to the registered user device 108. This may be in the form of an approval request containing request data (NonceAuth, Addr) initially generated by the service 102. As noted earlier, such a message relay service may be a third party server or service provider, for example third-party push messaging services, such as Google Cloud Messaging for Android™ and Apple Push Notification Service™. The function of message relay service can also be integrated into the authentication server, i.e., the authentication server may contact users' user devices or mobile devices directly to forward the authentication request.

As requested by the authentication server 110, the request data of approval request is relayed to the user device 108 by the message relay service 112 (step 650) along with the request. The message relay service 112 generally uses the channel ID to identify the user's registered user device and the communication channel/means that has been established exclusively for the registered user device 108. The message relay service 112 forwards NonceAuth and Addr to the user's registered user device 108 (i.e., enabled user device). in other words, the request data (NonceAuth, Addr) is transmitted (740) to the registered user device 108 by the authentication server 110 via the relay service 112.

The user device, or the software application AUTH APP executing on the user device 108, may provide a means for the user to indicate approval or rejection, such as hardware buttons or software buttons. Upon receiving the approval request relayed to it by the message relay service 112, the user device, or the software application executing on the user device 108 displays the information of NonceAuth and Addr on the user device, or otherwise makes the information available to the user, and prompts the user to verify/confirm the information. For example, the timestamp of the login request, the random number, and/or the web service's domain name can be displayed, if they are included in NonceAuth. If a hashtag, barcode, or picture has been computed based on the information and displayed on the user terminal 106, the user device, or the software application executing on the user device 108, can also display a barcode or picture computed from the received NonceAuth and Addr. The user can manually verify this information by comparing the information displayed on the user terminal 106 by the service (at step 640) and the information displayed on the user device 108 by the software application AUTH APP executing on the user device 108.

After verifying that the information, of NonceAuth and Addr presented by the user device 108 matches the one presented by the user terminal 106 (e.g., where the hashtags, barcodes, or pictures are the same), the user may approve the authentication request presented on the user device or by the software application executing on the user device 108 (e.g., by clicking an OK button) if the information mismatches or if the user does not want to continue the authentication process, the user may disapprove the authentication request e by clicking a Cancel button).

This manual confirmation/approval step may also be automated. For example, the user may set up a set of rules, such as a specific time period with a specific web service, to automatically approve some authentication requests. If an authentication request is found to meet the conditions set by the rule set, it is automatically approved without the user's further manual interaction; if an authentication request does not meet the condition defined by the rule set, it may reject the request or require the user's manual approval.

If a response indicating approval is received from the user (or if the user has programmed the device to always provide approval when certain conditions are met), the user device will generate an approval response, which may be in the form of a digital signature using the user's private key SK of the key pair PK/SK. For example, the user device may be programmed to compute a digital signature SigAuth(ID, NonceAuth, Addr) by using the private key SK. Similar to the Si nature for registration SigReg described earlier, SigAuth(ID, NonceAuth, Addr) denotes a digital signature computed based on at least a portion, often all, of the information of the tunic (ID, NonceAuth, Addr) by using a public-key or asymmetric cryptographic algorithm, such as RSA, DSA, or ECDSA. After the signature is generated, the user device 108 sends SigAuth (750) to the address Addr contained in the initial approval request data provided by the service 102 (step 660). Conveniently, the public-key certificate Cert[ID, PK] may be sent together to the address Addr with the signature SigAuth, though it will be understood that this certificate may also be provided by, for example, a public directory of certificates. For example, to save network data usage, the user device 108 (or the software application executing thereon) may just send ID rather than Cert[ID, PK], along with the signature SigAuth, to the service 102. The service 102 may retrieve the certificate Cert[ID, PK] associated with ID by looking up ID in certain public directories, such as a public database hosted by the authentication server 110 or the certificate authority 114 (CA). The service 102 may also generate or select an address Addr (step 620) that is unique to the user device 108, in which case it will not be necessary for the user device 108 to provide the user ID.

Upon receiving the approval response at the callback address, Addr, the service 102 will verify the signature SigAuth and grant access to the access request received at the beginning of this authentication process upon successful verification of the signature (step 670).

Verifying a digital signature may involve several steps, including verifying a digital certificate and then the digital signature. For example, first, Cert[ID, PK] is to be verified to be a valid certificate. This verification of the certificate may require the verification: the certificate is indeed issued by the CA 114 (verifiable by a public key of the CA 114), the certificate has not expired, and the certificate really belongs to the user's ID. After the certificate Cert[ID, PK] is verified, the service 102 also needs to verify the received signature SigAuth(ID, NonceAuth, Addr) by using the public, key PK embedded in the certificate Cert[ID, PK]. If SigAuth is also verified, access as requested by the user terminal 108 will be granted, for example, the service 102 may display a webpage on the display of the user terminal 106.

System 100 ma be used in conjunction with traditional password-based authentication schemes. In other words, system 100 may be integrated with a password-based system and provide a convenient security enhancement, i.e., a two-factor authenticator. In this case, user will log in to the website as usual by typing the username and password, followed by the authentication process described in reference to FIG. 6, where user's private key serves as the second authentication factor.

It may be possible that a user uses the same user device as a user terminal to access a service, e.g., logging in with a mobile web browser on a smart phone with the authentication application installed, or a user may use the user device to access an application executing on the user device that requires local authentication. As an alternative approach, the login/authentication request can be sent within the same hardware unit, without going through networked servers such as the authentication server 110 and the relay service 112, in order to save network communication time and/or network communication costs. More specifically, a variation of the authentication method described in reference to FIG. 1 to FIG. 7 may be used to authenticate a user who has an application program (OTHER APP) executing on a hardware unit that also has an authentication application (AUTH APP) executing thereon. The hardware unit has its own computation power and will be referred to as computation device 800 in the description of this implementation. Such a computation device 800 may be a mobile device such as a smart phone, a smart watch or other wearable devices, or may be a tablet computer, a notebook computer, a desktop computer or a more powerful computer that provides applications as a service.

Figure 8:
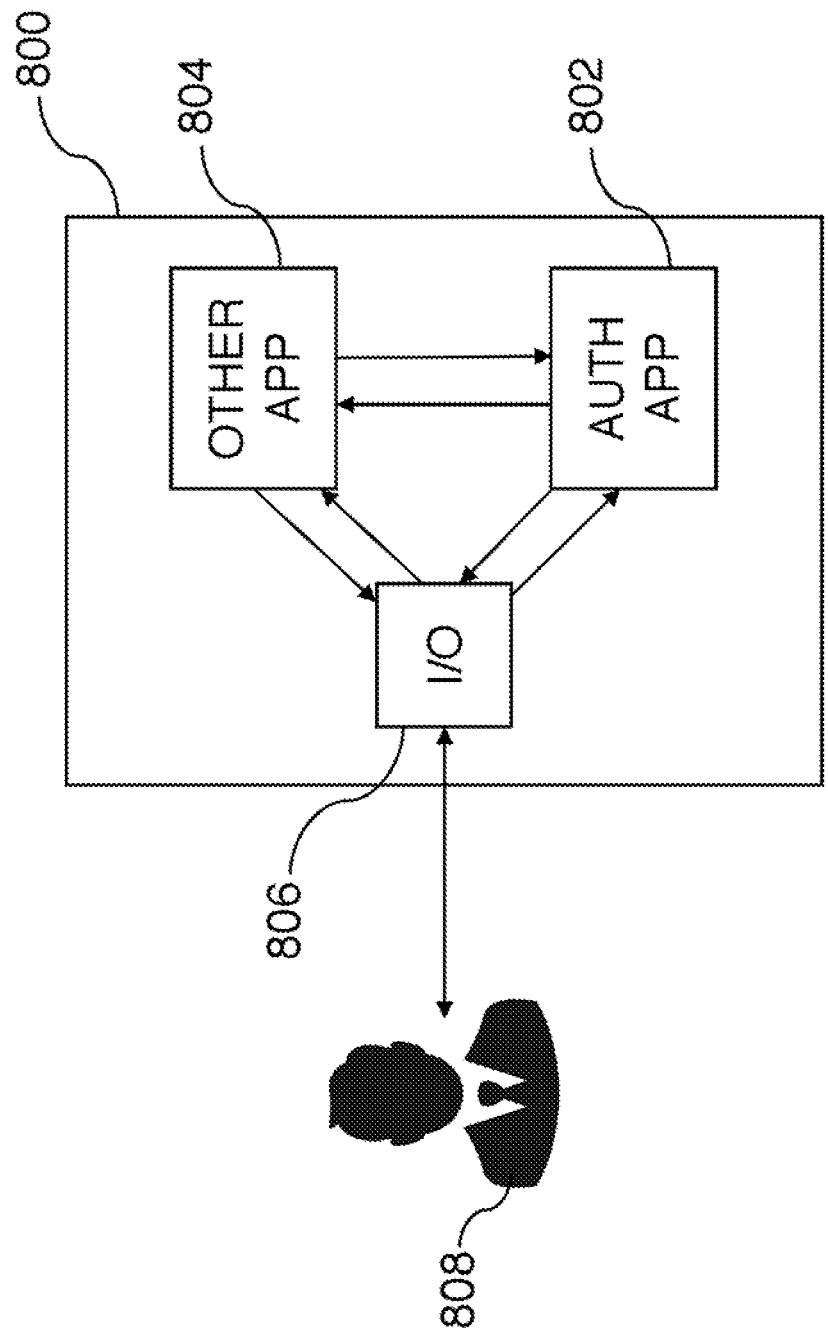
FIG. 8 is a block diagram to illustrate a configuration of a hardware unit that provides authentication service locally to another computerized service executing on the same hardware unit.

Referring to FIG. 8, AUTH APP 802 and OTHER APP 804 are programmed, i.e., configured to be capable of exchanging data with each other, The data may be a piece of information data or a request that causes the recipient of the request to execute a function, i.e., one or more process steps. The computation device 800 includes an input/output component 806 (or 110) for communicating with a user 808. As will he understood, both AUTH APP 802 and OTHER APP 804 are also capable of exchanging data with I/O 806. The AUTH APP 802 can be used to authenticate other applications, such as OTHER APP 804, installed on the same hardware unit (or the equivalent, of a single hardware unit, which may actually consist of a cluster of hardware units).

Here, OTHER APP 804 may be any application that requires local authentication, such as a locally installed program that requires user authentication or a locally installed and authenticated client application for accessing both local data and remotely stored data and provided services. Examples for OTHER APP 804 may include the Facebook™, Dropbox™ and Instagram™ iOS™ Android™ applications.

Figure 9:
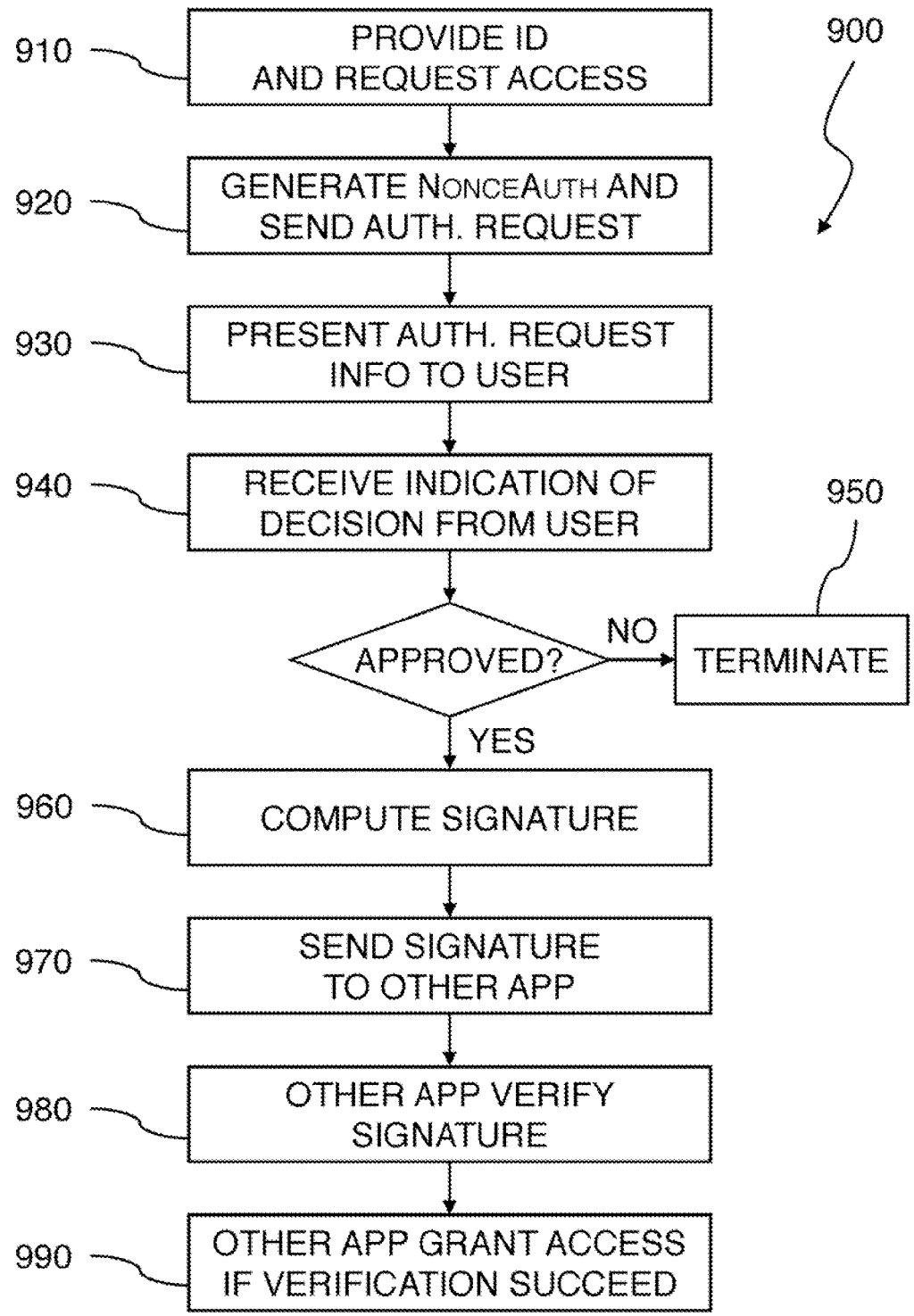
FIG. 9 is a flowchart illustrating a password-less authentication process that is useful for authenticating a local access request at an application that shares the same hardware unit with the authentication application, as shown in FIG. 8.

Referring to FIG. 9, there is illustrated in a flowchart a password-less authentication process that is useful for authenticating a local access request at an application that shares the same hardware unit with the authentication application, as shown in FIG. 8. In the following, it will be understood that the computation device 800 is already enabled for the process 900 shown in FIG. 9, i.e., the user device already has stored thereon a pair of the user's public key PK and the user's corresponding private key SK, and a public-key certificate Cert[ID, PK] issued by the CA 114.

In order to gain access, a user first enters his/her identity information (step 910), such as user ID, into the application OTHER APP 804 and request access. In response, OTHER APP 804 sends a local authentication request to AUTH APP 802 that is installed on the same computation device 800. The authentication request is sent along with authentication request data, which may contain the user's ID, the OTHER APP's identifier AppID, and a unique nonce string/number NonceAuth. As noted earlier, NonceAuth is generally required to be unique to each of the local authentication requests for a given pair of user ID and AppID for enhancing security and/or avoiding replay attacks. The identifier AppID may be the name of OTHER APP, or the internal address inside the computation device 800 for OTHER APP 804 to receive messages. This internal address may be used for the purpose of a callback address when the user device and the computerized service are executing on different hardware platform or hardware units.

Upon receiving the authentication request from OTHER APP 804, the information included in the authentication request data, such as the user's ID, the nonce NonceAuth, and the identifier AppID of OTHER APP 804, is extracted by AUTH APP 802 and rendered in a perceivable form for presenting to the user (step 930), e.g. displayed on a screen of the computation device's IO subsystem 806 or generating an audible message. The user will need to review this information to verify/confirm the information of the authentication request from OTHER APP 804. e.g., clicking an OK/Confirm button presented by the AUTH APP 802.

If the user confirms the authentication request from OTHER APP 804, an indication is generated by the user using the computation device's I/O by, e.g., clicking an OK/Confirm button presented by AUTH APP 802. This indication is received by AUTH APP 802 via computation device's I/O 806 (step 940). The user may also deny/forbid the authentication request by sending a different indication to AUTH APP 802, which it receives (e.g., by clicking a No/Cancel button). Upon receiving an indication of decision from the user at step 940, AUTH APP 802 will either terminate the process (step 950), if an indication of denial is received, or proceed to compute a digital signature (step 960). The digital signature, SigAuth(ID, NonceAuth, AppID), is computed from at least a portion, often all, of the information of the tuple (ID, NonceAuth, AppID) by using the user's private key SK After the signature SigAuth is generated, AUTH APP 802 sends the signature, SigAuth, together with the user's certificate Cert[ID, PK], to OTHER APP 804 at step 970. Next, OTHER APP 804 verifies the signature (step 980), and upon successful verification, grants access to the user (step 990).

As a further variation, a user requesting access may not provide user's ID to OTHER APP 804. OTHER APP 804 in this case will only display the request data to the user or request MYTH APP 802 to display the request data to the user. The user may cause the computation device 800 to generate either an approval or a denial response, which response is received by AUTH APP 802. As before, if the user provides an indication of denial, AUTH APP 802 will terminate the process (step 950). On the other hand, if the user provides an indication of approval AUTH APP 802 will generate a signature SigAuth(ID, NonceAuth, AppID) using the private key SK and send the user's public-key certificate Cert[ID, PK] along with the signature SigAuth to OTHER APP 804. The other application, OTHER APP 804, can retrieve user ID from the certificate upon receipt of the signature SigAuth. Thus the user does not need to manually enter ID during the authentication process. The authentication process may then continue using the :ID so retrieved, namely to follow the steps 910 to 990 as described before, or, alternatively, based on verification result of verifying the signature. OTHER APP 804 may simply grant access to the user.

In one example of a method of authenticating a user requesting access to a computerized service, the user has a pair of public key and a corresponding private key. The method includes the steps of transmitting an access request to the computerized service, the computerized service generating an authentication request and providing the authentication request to an authentication service separate from the computerized service, the authentication request including authentication request data provided by the computerized service, receiving from the authentication service at a callback address included in the authentication request data a response that includes a digital signature signed using the user's private key and that is generated incorporating at least the authentication request data, verifying the digital signature, and upon successful verification of the digital signature, the computerized service granting the access request to the user. According to this example, the authentication service can be provided by an authentication server connected to the computerized service over a communication network.

The response may be generated by a user device of the user, which is connected to the authentication server over the communication network, and the method may further include the steps of, prior to generating the response: the user device registering the user's identity information and message relay information to the authentication server, and the authentication server storing the user's identity information and the message relay information in an associated relationship, and the additional steps of, after providing the authentication request to the authentication service: the authentication server relaying the authentication request data to the user device utilizing a relay channel identified by the message relay information, and the user device generating the response and forwarding the response to the computerized service at the callback address.

The method may also include other steps, such as the steps of, upon receiving the relayed authentication request data from the authentication server, the user device rendering the authentication request data for user inspection, and upon receiving an approval confirmation from the user entered using the user device, the user device generating the response and forwarding the response to the computerized service at the callback address.

Additionally, the computerized service may render separately the authentication request data for user comparison. For example, when the authentication request data includes login information relating to the access request, both the user device and the computerized service may render the login information for visual display to the user for comparison.

In some configurations, the relay channel may be a communication channel between a message relay service connected to the communication network and the user device, and the communication channel is identified by message relay information. When so configured, the authentication server can forward the authentication request data to the message relay service, identifying to the message relay service the communication channel using the message relay information, and the message relay service can relay the authentication request data to the user device through the communication channel between the user device and the message relay service. Additionally, the message relay information can be sent to the user device from the message relay service, so that the user device can transmit further the message relay information to the authentication server, and the authentication server will store the message relay information on a storage device and associate the message relay information with the user identity information.

In some other configurations, the computerized service and the authentication service are executing on a common user device. The callback address included in the authentication request data can be an internal address of the common user device. Additionally, the authentication request data may include login information relating to the access request, so that the authentication service can display the login information to the user. The user then enters an indication of approval using the user device, which is then sent to the authentication service to approve the request. The authentication service will then generate the digital signature using the user's private key, and send the response, including the digital signature, to the internal address.

In another example, a system is implemented to provide authentication of a user to a service that is connected to a communication network. An authentication signature is signed by a user device using a private key of a public/private key pair owned by the user. After the signature is successfully verified, the service grants user access. Such a system includes an authentication server connected to the communication network for receiving authentication request from the service and for receiving registration request from a user. The authentication server has a memory storage device that has stored thereon user identity information data and channel identification data associated therewith. The channel identification data contains information identifying a communication channel between a user device of the user and a message relay service connected to the network.

As a variation, in response to an access request at the service initiated by or on behalf of a user, the service generates an authentication request, which contains authentication request data. This request is sent to the authentication server. The authentication server is configured to, upon receiving this request, together with the corresponding user identity information data, retrieve from the memory storage device the channel identification data associated with the user's user identity information data, generate an approval request which includes the authentication request data, and send the approval request to the message relay service for relaying to the user device for the user device to generate an authentication signature from the authentication request data and the user identity information data using the user's private key. The service grants access to the access request if the service receives from the user device at a callback address identified by the server the authentication signature and successfully verifies the authentication signature.

The authentication server of the system may be configured to perform a number of additional steps, such as: generating an authentication registration challenge and providing the authentication registration challenge to the user device, receiving from the network a registration signature signed by the user device using the private key of the public/private key pair and generated from the authentication registration challenge, the user identity information data, and the channel identification information data, verifying the registration signature, associating the user identity information data with the channel identification information data upon successful verification of the registration signature, and storing the user identity information data with the channel identification information data to the authentication server's memory storage device. The authentication server may be configured to perform these steps only upon receiving from a user device a registration request that includes a digital certificate signed by a certification authority. The digital certificate will include a public key from the public/private key pair, the user identity information data, and a channel identification information data provided by the message relay service.

As before, the authentication request data may include the callback network address that is generated by and included in the authentication request data by the service. The digital certificate may be stored on the user device.

In another example, there is provided a communication device. The communication device provides authentication to a networked service, which is connected to an authentication server through a communication network and has a communication channel linking a message relay service. The communication device includes a cryptographic unit; a network interface for connecting the communication device to the communication network; a memory storage device; and a microprocessor for executing instructions stored on the memory storage device. The stored instructions, when executed by the microprocessor, cause the microprocessor to perform steps of a method that include the steps of: upon receiving an approval request from the message relay service through the communication channel, the approval request including authentication request data generated by the service in response to an access request initiated by or on behalf of the user, making available to the user information content of the access request contained in the authentication request data; receiving an approval confirmation from the communication device, generating an authentication signature using the user's private key from the authentication request data and the user's identity information data; transmitting the authentication signature over the communication network to a callback address contained in the authentication request data for the service to verify and to grant access to the user's access request upon successful verification of the authentication signature.

The method directed by the stored instructions may include the additional steps of: requesting the message relay service to establish the communication channel and receiving from the message relay service the channel identification information data that identifies the communication channel; and registering the user identity information and the message service information with the authentication server.

A further example is a method of registering a user device to an authentication server connected to a communication network. A pair of public key and a corresponding private key owned by the user are stored on the user device. The method includes the steps of: selecting user identity information data of the user; obtaining a digital certificate issued by a certification authority, the digital certificate containing the public key of the public/private key pair and the user identity information data; obtaining the user's channel identification data, the channel identification data containing information identifying a communication channel between a message relay service the user device, providing the digital certificate and the channel identification data to the authentication server; the authentication server generating a challenge and sending the challenge to the user device of the user; the user device generating a registration signature using the private key from the challenge, the channel identification data and the user identity information data, and transmitting the registration signature to the authentication server for verification; the authentication server associating the user identification information data with the channel identification data if the registration signature is successfully verified.

Optionally, to obtain the digital certificate, the user device generates the public/private key pair and transmits the public key and the user identity information data to the certification authority over the network for the certificate authority to generate the digital certificate, which is then received for later use. The certificate authority may perform the additional steps of verifying user identity information contained in the user identity information data, generating the digital certificate using the public key and the user identity information data received, and transmitting the digital certificate to the user device over the network.

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof.

What is claimed is:

1. A method of authenticating a user request of a user to gain access to a computerized service, the method comprising:

upon receiving the user request, the computerized service transmitting an authentication request to an authentication service, along with user information and authentication request data that includes user request information associated with the user request and information about the computerized service including a callback address of the computerized service, wherein the authentication request data includes at least one of an identification of the computerized service, session data related to the user request which includes session login information, the computerized service being requested and an identifier generated at the computerized service to identify the user request, upon receiving the authentication request, the authentication service transmitting an approval request to a user device of the user, the approval request including at least a portion of the authentication request data, wherein the user device and user identity information included in the user information are pre-registered with the authentication service, the computerized service computing a verification result from a user approval response received from and generated at the user device, public user data and the authentication request data, the user approval response being generated at the user device from both the authentication request data received at the user device and additional private user data that is cryptographically related to the public user data and a copy of the user identity information stored at the user device, the user approval response being transmitted from the user device to the callback address of the computerized service directly without further utilization of the authentication service, the callback address being included in both the authentication request data received at the authentication service and the portion of the authentication request data received at the user device, and the computerized service granting access as requested in the user request only upon successful verification of the user approval response being cryptographically related to the additional private user data stored at the user device and the authentication request data transmitted from the computerized service.

2. The method of claim 1, wherein the user approval response is generated according to input received from the user at the user device.

3. The method of claim 1, wherein the user has a pair of public and private encryption keys, the additional private user data including the private encryption key and the public user data including the public encryption key, and wherein the user approval response is generated from the authentication request data utilizing the private encryption key and the verification result is computed at the computerized service utilizing the public encryption key.

4. The method of claim 3, wherein the user approval response includes a digital signature signed using the private encryption key and the verification result computed includes a computed verification of the digital signature, and wherein the computerized service grants access to the user request upon successful verification of the digital signature.

5. The method of claim 1, wherein the user device communicates with the computerized service over communication network and the callback address is a callback network address.

6. The method of claim 1, wherein the authentication service is provided by an authentication server connected to both the computerized service and the user device over communication network, and the authentication server transmits the authentication request through a message relay server connected to the communication network, the method further comprising the steps of, prior to generating the user approval response:
the user device registering the user identity information and message relay information to the authentication server, the message relay information identifying the message relay server for relying transmission to the user device, and
the authentication server storing the user identity information and the message relay information in an associated relationship, and
the step of transmitting by the authentication service further comprising:
retrieving the message relay information based on the association between the user identity information and the message relay information to identify the message relay server, and
effectuating the transmission from the authentication service to the user device by first transmitting to the message relay service for the message relay service to transmit to the user device.

7. The method of claim 6, wherein the authentication server verifies cryptographically both the user identity information and the message relay information being originated from the user or the user device prior to associating the user identity information with the message relay information.

8. The method of claim 7, wherein the message relay information identifies a relay channel connecting the user device to the message relay service, and wherein the message relay server completes the transmission by transmission through, at least partially, the relay channel.

9. The method of claim 8, wherein the relay channel is unique to the user device.

10. The method of claim 8, the method comprising the further steps of, after receiving the authentication request data at the authentication server:
the authentication server forwarding the authentication request data to the message relay service, identifying to the message relay service the relay channel, and
the user device receiving the authentication request data from the message relay service through the relay channel.

11. The method of claim 8, wherein the relay channel is designated by the message relay service, the method further comprising the steps of, prior to generating the user approval response:
the user device receiving the message relay information from the message relay service and transmitting the message relay information to the authentication server, and
the authentication server storing the message relay information and the user identity information on a non-transient storage device in an associated manner.

12. The method of claim 6, herein the user has a pair of public and private encryption keys, and the step of registering the user identity information and the message relay information further comprising:
selecting the user identity information data for inclusion in the user information;
obtaining a digital certificate issued by a certification authority and generated from the user identity information data and the public encryption key;
obtaining from the message relay service the message relay information that includes channel identification data identifying a relay channel for connecting the user device to the message relay service,
transmitting the digital certificate and the channel identification data to the authentication server;
the authentication server generating a challenge and sending the challenge to the user device;
the user device, generating a registration signature, using the private encryption key, from the challenge, the channel identification data and the user identity information data, and transmitting the registration signature to the authentication server for verification;
the authentication server associating the user identity information data with the channel identification data if the registration signature is successfully verified.

13. The method of claim 1, wherein the computerized service and the authentication service are executing on the user device, the method comprising the further step of:
the computerized service providing an internal address within the user device as the return destination.

14. The method of claim 13, wherein the authentication request data includes the session login information, the method further comprising the steps of:
the computerized service rendering the session login information for inspection by the user,
receiving an indication of approval of the access request from the user entered using the user device, generating the user approval response according to the indication of approval, and sending the user approval response to the internal address.

15. The method of claim 13, wherein the user has a pair of public and private encryption keys, and wherein generating the user approval response includes generating a digital signature using the user's private encryption key, sending the user approval response includes sending the digital signature to the internal address, and verification of the user approval response includes verification of the digital signature by the computerized service using the public encryption key.

16. The method of claim 1, the method comprising the further step of:
    upon receiving the authentication request data, the user device rendering the authentication request data for user inspection,
    wherein the user device generating the user approval response only after receiving an approval confirmation from the user entered using the user device.

17. The method of claim 16, the method further comprising the step of:
    the computerized service rendering at least a portion of the authentication request data for visual display to the user for user comparison.

18. The method of claim 17, wherein the user initiates the user request from a user terminal remote from the computerized service, the method further comprising the step of:
    the computerized service transmitting to the user terminal through a secure channel information rendered for visual display at the user terminal.

19. The method of claim 17, wherein both the user device and the computerized service renders the login information for visual display to the user and for user comparison.

20. A system for providing a computerized service to a user that requires authentication of the user, the user having a pair of public encryption key and a corresponding private encryption key and having a user device that has stored thereon the private encryption key and user identity information, the system comprising:
    a service hardware device having a computerized service executing thereon;
    an authentication hardware device having an authentication service executing thereon, the authentication hardware device being connectable with the service hardware device for receiving authentication request from the computerized service and connectable with the user device for forwarding approval request, the user device and the user identity information being pre-registered with the authentication service;
    a user interface connected to the service hardware device, for receiving and forwarding to the computerized service a user request to gain access to the computerized service;
    the computerized service being configured to generate authentication request data and forward an authentication request, a copy of the user identify information, and the authentication request data to the authentication service upon receiving the user request, the authentication request data including user request information associated with the user request and information about the computerized service including a callback address of the computerized service;
    the authentication service being configured to transmit an approval request to the user device upon receiving the authentication request, the approval request including at least a portion of the authentication request data, wherein the user device generates a user approval response from the portion of the authentication request data included in the approval request and the user's private key and transmits the user approval response to the callback address of the computerized service directly without further utilization of the authentication service; and
    the computerized service being further configured to compute a verification result from the user approval response received directly from the user device, the verification requiring both the user's public encryption key and response data included in the user approval response, and to grant access as requested in the user request only upon successful verification of the user approval response being cryptographically related to the user's private encryption key stored at the user device and the portion of the authentication request data transmitted from the computerized service.

21. The system of claim 20, wherein the response data includes a digital signature generated at the user device from the portion of the authentication request data and the private encryption key, and wherein the verification of the user approval response includes verification of the digital signature at the computerized service.

22. The system of claim 20, wherein the authentication service resides in an authentication server separate from the service hardware device and wherein both the authentication server and the service hardware device communicate with the user device over a communication network, and the system further comprising:
    data communication connection interface at the authentication server for connection to a message relay server, the message relay server maintaining a relay channel between the message relay server and the user device, wherein the authentication server is configured to transmit approval request together with message relay information to the message relay server, the message relay information identifying the relay channel to the message relay server for the message relay server to forward the approval request to the user device using the relay channel.

23. The system of claim 22, further comprising:
    a non-transient storage device for the authentication service, the non-transient storage device having stored thereon the user identity information and the message relay information in an associated relationship.

24. The system of claim 23, further comprising:
    a cryptographic unit, the cryptographic unit performing cryptographic functions to verify cryptographically both the user identity information and the message relay information being originated from the user and being configured to send verification result to the authentication server.

25. The system of claim 22, wherein the callback address is a callback network address of the computerized service.

26. The system of claim 25, wherein the callback network address is selected and included in the authentication request data by the computerized service.

27. The system of claim 20, wherein the computerized service and the authentication service are executing on the user device, and the callback address is an internal address within the user device.

28. The system of claim 27 wherein the user device has stored thereon additionally a public-key certificate, and wherein the authentication service is further configured to, in response to receiving a first authentication request from the computerized service without being provided with user information:
    generate a first user approval response using the private encryption key upon receiving an input at the user device indicating user approval,
    send the first user approval response and the public-key certificate to the computerized service for the computerized service to verify the first user approval response and to extract the user identity information from the public-key certificate,
    and wherein the computerized service is further configured to, prior to generating the authentication request data:

generate the first authentication request upon receiving a user request that lacks the user identity information, send the first authentication request to the authentication service, and verify the first user approval response returned from the authentication service and retrieve the user identity information from the public-key certificate for sending with the authentication request.

29. A communication device for providing authentication of a user to a networked service, the networked service being connected to an authentication server over a communication network, the user having a pair of public and private encryption keys, said communication device comprising:

a cryptographic unit;

a user I/O unit;

a network interface for connecting the communication device to the communication network;

a non-transient storage device having computer instructions, user identity information and the private encryption key stored thereon; and a microprocessor for executing the stored computer instructions stored;

wherein the stored computer instructions, upon being executed by the microprocessor, cause the microprocessor to perform steps of a method comprising the steps of:

upon receiving an approval request from the authentication server through the network interface, the approval request including authentication request data generated at the networked service in response to an access request initiated by or on behalf of the user, the authentication request data including user request information associated with the user request and information about the networked service being accessed, the information about the networked service including a callback network address of the networked service;

rendering the authentication request data on the user I/O unit for user inspection;

receiving an input indicating user approval from the user at the user I/O unit;

generating a user approval response based on the user input, the user approval including an authentication signature computed by the cryptographic unit from the authentication request data, the user identity information, and the private encryption key stored on the memory storage device;

transmitting the authentication signature directly to the callback network address of the networked service utilizing the network interface and without further utilization of the authentication server, the callback network address being contained in both the authentication request data and the approval request.

30. The communication device of claim 29, wherein the method steps performed by the microprocessor further comprising:

requesting the message relay service to designate the communication channel and receiving from the message relay service the channel identification information data that identifies the communication channel; and registering the user identity information and the message service information with the authentication server in an associated manner.

31. The communication device of claim 29, wherein the authentication signature is a digital signature computed from a triplet of the user identity information, the call back network address, and an identifier generated at the computerized service pairing the user request with the user identity information, and signed using the private encryption key.

\* \* \* \* \*